United States Patent
Volny et al.

(10) Patent No.: US 10,752,368 B2
(45) Date of Patent: Aug. 25, 2020

(54) ASYMMETRIC YOKE

(71) Applicant: GOODRICH CORPORATION, Charlotte, NC (US)

(72) Inventors: Jaro S. Volny, Scottsdale, AZ (US); Drew Hartman, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/728,150

(22) Filed: Dec. 27, 2019

(65) Prior Publication Data

US 2020/0148371 A1    May 14, 2020

Related U.S. Application Data (62) Division of application No. 15/466,041, filed on Mar. 22, 2017, now Pat. No. 10,556,698.

(51) Int. Cl.
*B64D 25/14*     (2006.01)
*B63C 9/04*      (2006.01)
*B63B 27/14*     (2006.01)

(52) U.S. Cl.
CPC .............. *B64D 25/14* (2013.01); *B63B 27/14* (2013.01); *B63C 9/04* (2013.01)

(58) Field of Classification Search
CPC .. B64D 25/14; B64D 25/18; B63C 2009/042; B63C 9/22; B63C 9/04; B63B 27/14
USPC .................................. 193/2 R, 25 A; 182/48
See application file for complete search history.

(56) References Cited

U.S. PATENT DOCUMENTS

| | | | |
|---|---|---|---|
| 3,669,217 A | 6/1972 | Fisher | |
| 3,944,023 A | 3/1976 | Fisher | |
| 4,339,019 A | 7/1982 | Tracy | |
| 4,460,062 A | 7/1984 | Fisher | |
| 4,526,262 A | 7/1985 | Malcom | |
| 4,567,977 A | 2/1986 | Fisher | |
| 5,711,495 A | 1/1998 | Danielson | |
| 5,906,340 A | 5/1999 | Duggal | |
| 6,877,696 B2 | 4/2005 | Moro | |
| 7,090,168 B1 | 8/2006 | Brown | |
| 9,296,484 B2 | 3/2016 | Biro | |
| 10,556,698 B2 * | 2/2020 | Volny | ..................... B64D 25/14 |
| 2017/0015429 A1 | 1/2017 | Evans et al. | |

FOREIGN PATENT DOCUMENTS

EP         96594         12/1983

OTHER PUBLICATIONS

USPTO; Restriction Requirement Office Action dated Mar. 11, 2019 in U.S. Appl. No. 15/466,041.
USPTO; Pre-Interview first Office Action dated Jun. 3, 2019 in U.S. Appl. No. 15/466,041.

(Continued)

*Primary Examiner* — James R Bidwell
(74) *Attorney, Agent, or Firm* — Snell & Wilmer L.L.P.

(57) ABSTRACT

An evacuation assembly may comprise an evacuation slide and a first yoke coupled to the evacuation slide. The first yoke may comprise a first strap and a second strap. The first strap may be longer than the second strap. The evacuation assembly may optionally include a second yoke coupled to the evacuation slide. A first strap of the second yoke may be longer than a second strap of the second yoke.

9 Claims, 10 Drawing Sheets

(56) References Cited

OTHER PUBLICATIONS

USPTO; First Action Interview Office Action dated Jul. 17, 2019 in U.S. Appl. No. 15/466,041.
USPTO; Notice of Allowance dated Oct. 25, 2019 in U.S. Appl. No. 15/466,041.
European Patent Office, European Office Action dated Aug. 12, 2019 in Application No. 18163453.6.
European Patent Office, European Search Report dated Jun. 13, 2018 in Application No. 18163453.6-1010.
Rus Timerbayev: "Airbus A321 emergency evacuation slide test", youtube, Apr. 14, 2014 (Apr. 14, 2014), p. 1 pp., Retrieved from the Internet: URL:https://www.youtube.com/watch?v=rFfthq TQdrs, retrieved on May 4, 2018.
Jim Bell: "A321 Escape Slide Deployment", youtube, Jan. 27, 2012 (Jan. 27, 2012), p. 1 pp., Retrieved from the Internet: URL:https://www.youtube.com/watch?v=Xpb1x-uhn8M, retrieved on May 4, 2018.
Ayqxbr: "737 emergency slide deployment", youtube, Nov. 9, 2009 (Nov. 9, 2009), p. 1 pp., Retrieved from the Internet: URL:https://www.youtube.com/watch?v=GWQRDifF96A&list=PLn3VOdV9bjPift6NHus8g7WIHukKO3AY&index=14, retrieved on May 7, 2018.
Cesligar: "737-700 Escape Slide", youtube, Feb. 6, 2014 (Feb. 6, 2014), p. 1 pp., Retrieved from the Internet: URL:https://www.youtube.com/watch?v=TiDNR3 YB1WA&index=I5&list=PLn3V-OdV9bjPift6NHus8 g7WIHukK03AY, retrieved on May 7, 2018.
Immedi a: "Immedi a Rescue—Emergency Evacuation Slide System", Dec. 16, 2016 (Dec. 16, 2016), Retrieved from the Internet: URL:http://cdn.medicaleshop.com/media/pdfs /immedia/brochure/rescuesheet-br.pdf,retrieved on May 4, 2018.

\* cited by examiner

ASYMMETRIC YOKE

CROSS REFERENCE TO RELATED APPLICATIONS

This application is a divisional of, and claims priority to and the benefit of, U.S. Ser. No. 15/466,041, filed Mar. 22, 2017 and entitled "ASYMMETRIC YOKE," which is hereby incorporated by reference in its entirety for all purposes.

FIELD

The present disclosure relates to aircraft evacuation assemblies, and more specifically to restraint devices for evacuation slides and methods of making an evacuation assembly.

BACKGROUND

An evacuation slide assembly may include an inflatable slide that helps passengers disembark from an aircraft in the event of an emergency or other evacuation event. The slides may deploy from a door sill or a side of the aircraft fuselage. A common problem associated with inflatable evacuation slides, however, is that when such slides are deployed in high lateral wind conditions, the wind may cause the slide to "kite" such that the toe end of the slide does not touch the ground, rendering the slide less usable. If the slide lifts off the ground to a point above the airplane's door sill height after full extension, the slide may block the aircraft exit and prevent safe evacuation of passengers and crew. Further, for slides located near a forward end of an aircraft engine, any kiting is disfavored, as it could lead to contact with the engine.

SUMMARY

Disclosed herein, according to various embodiments, is an evacuation assembly. An evacuation assembly may comprise an evacuation slide; and a deployment assembly coupled to the evacuation slide and configured such that during a deployment of the evacuation slide a forward portion of a toe end of the evacuation slide contacts an exit surface prior to an aft portion of the toe end of the evacuation slide.

In various embodiments, the deployment assembly may comprise a first yoke comprising a first strap and a second strap, wherein the first strap is longer than the second strap. The first strap may be coupled to a forward portion of the evacuation slide and the second strap may be coupled to an aft portion of the evacuation slide. A ratio of a length of the first strap to a length of the second strap may be from 6:5 to 4:1. The first strap may be between 6 inches and 9 feet longer than the second strap.

In various embodiments, the deployment assembly may further comprise a second yoke, wherein a first strap of the second yoke is longer than a second strap of the second yoke. The second yoke may be located closer to the toe end of the evacuation slide than the first yoke. A first releasable restraint may be coupled between the first yoke and the evacuation slide; and a second releasable restraint may be coupled between the second yoke and the evacuation slide, wherein the first releasable restraint is configured to separate prior to the second releasable restraint during the deployment of the evacuation slide. A difference in a length of the first strap of the first yoke and a length of the second strap of the first yoke may be greater than a difference in a length of the first strap of the second yoke and a length of the second strap of the second yoke.

In various embodiments, the deployment assembly may further comprise a third yoke coupled to the evacuation slid, wherein a first strap of the third yoke and a second strap of the third yoke may be approximately equal in length. The third yoke may be positioned closer to a head end of the evacuation slide than the first yoke and the second yoke.

In various embodiments a yoke for an evacuation system is disclosed. A yoke for an evacuation system may comprise a first strap and a second strap coupled to the first strap, wherein the first strap is longer than the second strap.

In various embodiments, a ratio of a length of the first strap to a length of the second strap may be from 6:5 to 4:1. The first strap may be from 6 inches to 9 feet longer than the second strap. The first strap and second strap may be sewn together.

In various embodiments, a method of making an evacuation assembly is disclosed. A method of making an evacuation assembly may comprise coupling a first yoke to an evacuation slide, the first yoke comprising, a first strap and a second strap, wherein the first strap is longer than the second strap.

In various embodiments, the method may further comprise coupling the first strap to a forward edge of the evacuation slide, and coupling the second strap to an aft edge of the evacuation slide. The method may further comprise coupling a second yoke to the evacuation slide, wherein a first strap of the second yoke is longer than a second strap of the second yoke. A difference in a length of the first strap of the first yoke and a length of the second strap of the first yoke may be greater than a difference in a length of the first strap of the second yoke and a length of the second strap of the second yoke. The method may further comprise coupling the second yoke closer to a toe end of the evacuation slide than the first yoke.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosures, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not be necessarily be repeated herein for the sake of clarity.

As used herein, "aft" refers to the direction associated with the tail (i.e., the back end) of an aircraft, or generally, to the direction of exhaust of the gas turbine. As used herein, "forward" refers to the direction associated with the nose (i.e., the front end) of an aircraft, or generally, to the direction of flight or motion.

Evacuation slides according to the present disclosure may extend from an aircraft structure, such as, for example, a fuselage or a wing, to an exit surface in a fully deployed position. During deployment, a deployment assembly coupled to the evacuation slide may aid in controlling the inflation and deployment of the slide. The deployment assembly according to the present disclosure, may allow forward portions of the slide to open and/or inflate and/or unfold at a faster rate than aft portions of the slide to prevent kiting of the slide and/or cause a forward portion of the toe end of the slide to contact the exit surface prior to an aft portion of the toe end of slide. The deployment assembly, according to the present disclosure, may comprise one or more asymmetric yokes.

Figure 1:
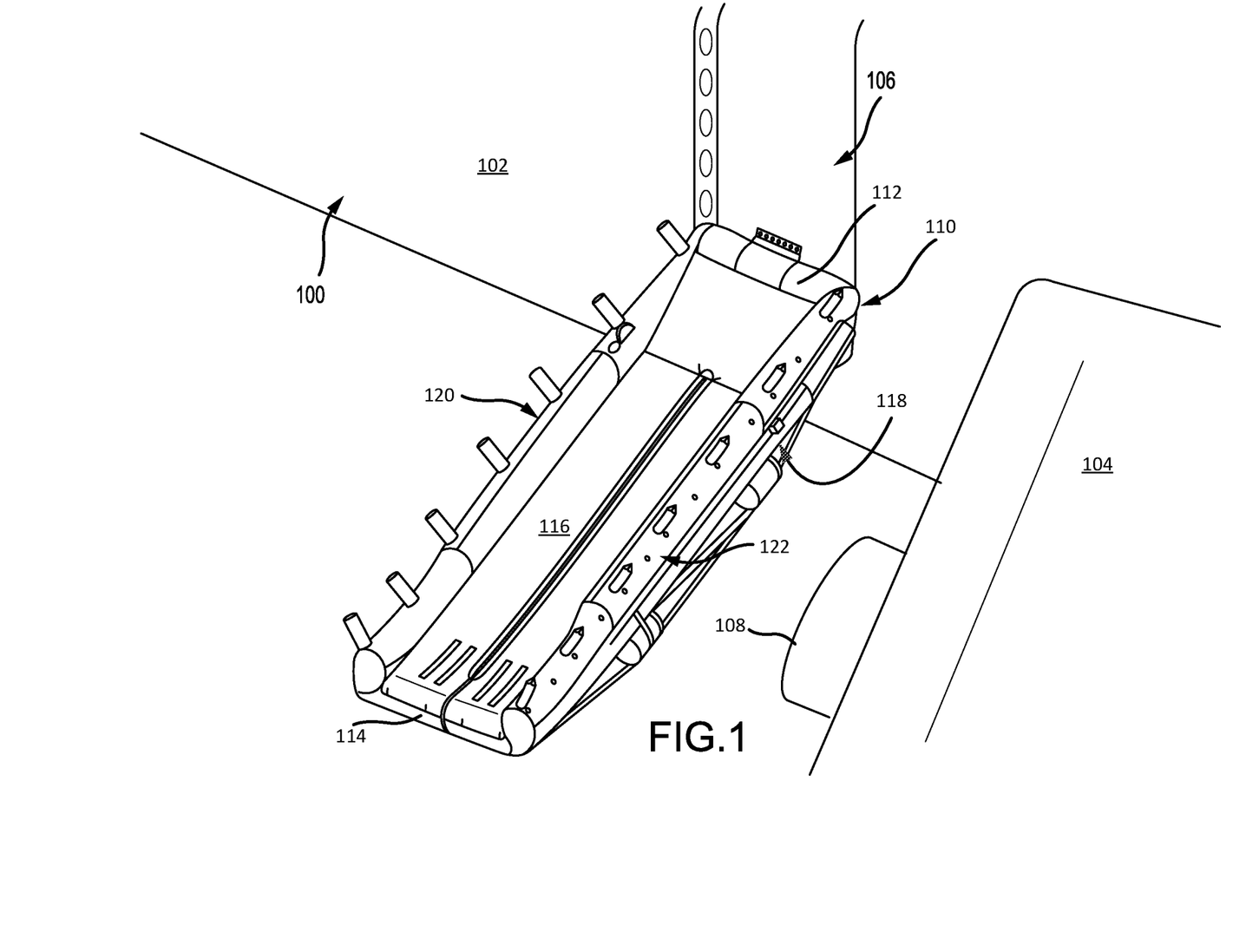
FIG. 1 illustrates a perspective view of an evacuation slide in a deployed position, in accordance with various embodiments.

With reference to FIG. 1, an exemplary aircraft 100 is shown, in accordance with various embodiments. Aircraft 100 may comprise a fuselage 102 with wing 104 fixed to fuselage 102. Engine 108 may be coupled to an underside of wing 104. Emergency exit door 106 may be located on fuselage 102, forward wing 104 and engine 108. An evacuation slide 110 may be deployed from emergency exit door 106. Evacuation slide 110 may comprise a head end 112 and a toe end 114 opposite head end 112. Head end 112 may be coupled to aircraft structure 100. Evacuation slide 110 may comprise a sliding surface 116 (also referred to as a top surface) and a rear surface 118 (also known as an underside surface) that is opposite sliding surface 116. Evacuation slide 110 may comprise a forward edge 120 that is distal to engine 108 and an aft edge 122 that is proximate to engine 108. Evacuation slide 110 may comprise an inflatable slide. FIG. 1 illustrates evacuation slide 110 in an inflated and/or deployed position. Evacuation slide 110 may comprise a dual lane slide. However, evacuation slide 110 may comprise any number of lanes. Toe end 114 may be configured to contact an exit surface in response to evacuation slide 110 being deployed.

Figure 2:
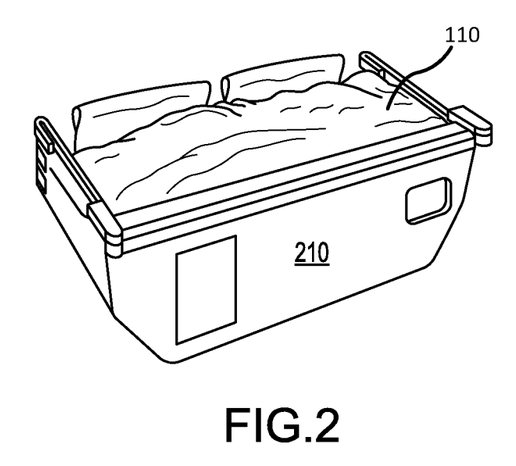
FIG. 2 illustrates a perspective view of an evacuation slide in a stowed position, in accordance with various embodiments.

With reference to FIG. 2, evacuation slide 110 is illustrated in a stowed and/or packed position. In this regard, evacuation slide 110 may be stowed in a packboard 210. In various embodiments, evacuation slide 110 may be folded in the stowed position. In various embodiments, evacuation slide 110 may be deployed from packboard 210 in response to opening an emergency exit door. Packboard 210 may be coupled to an aircraft in an installed position. Typically, a packboard 210 includes a blow-out panel which opens in response to deployment of evacuation slide 110, and through which the inflatable slide may exit the packboard. In this regard, evacuation slide 110 may be configured to be deployed from an aircraft.

Figures 3A, 3B, 3C:
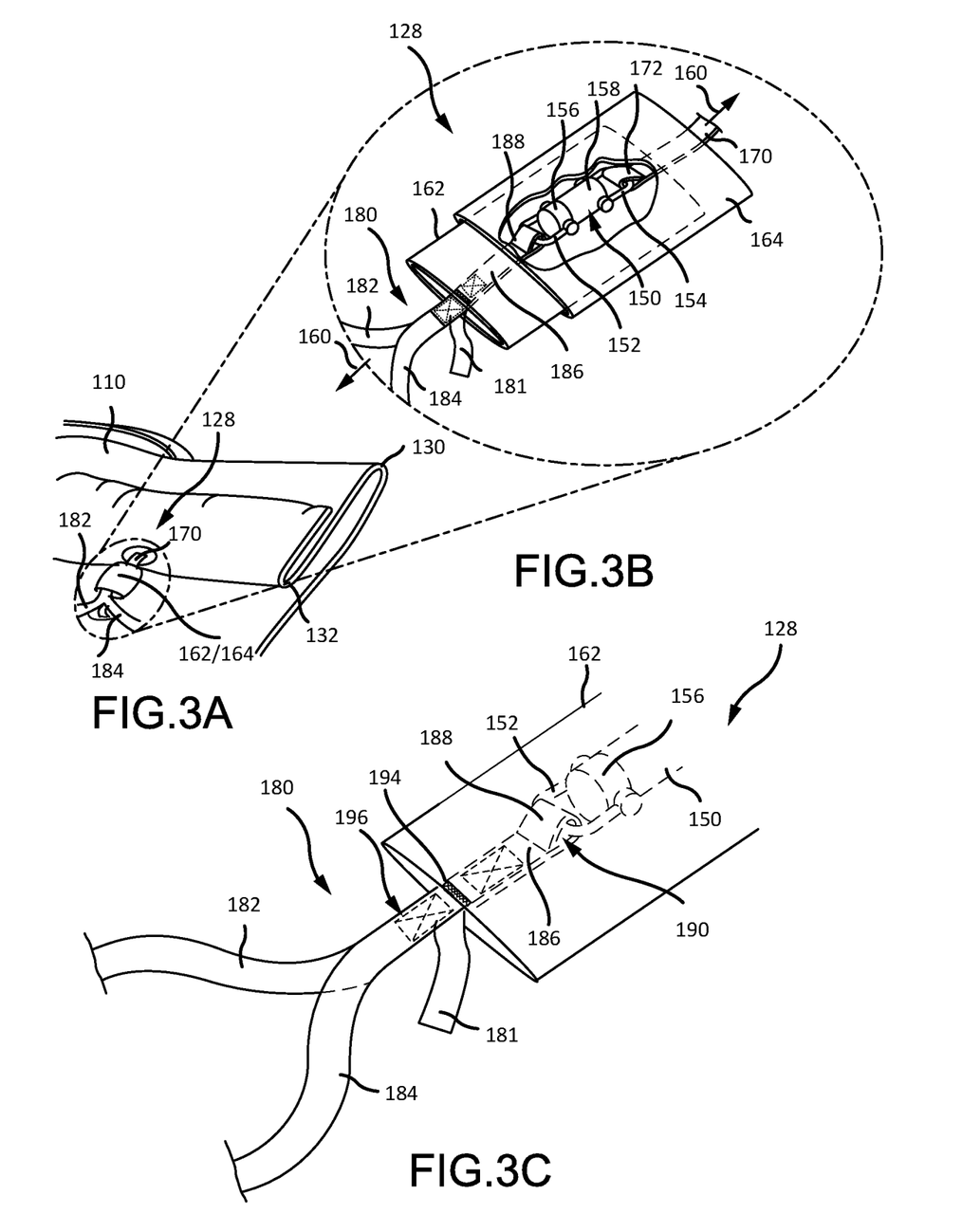
FIGS. 3A, 3B, and 3C illustrate a releasable restraint retaining an evacuation slide in a folded position, in accordance with various embodiments.

With reference to FIG. 3A and FIG. 3B, evacuation slide 110 is illustrated in a folded position, in accordance with various embodiments. When evacuation slide 110 is in the folded or stowed position, evacuation slide 110 may include a plurality of folds, including first fold 130 and second fold 132. A deployment assembly 128 may aid in maintaining first fold 130 and second fold 132. Deployment assembly 128 may also aid in a staged deployment of evacuation slide 110. Deployment assembly 128 may include a releasable restraint 150. Releasable restraint 150 may aid in maintaining first fold 130 and/or second fold 132. Releasable restraint 150 may aid in a staged deployment of evacuation slide 110. Evacuation slide 110 may unfold in response to releasable restraint 150 separating.

In various embodiments, releasable restraint 150 may be configured to separate in response to an internal pressure in evacuation slide 110. For example, a gas cylinder may supply a flow of pressurized fluid to evacuation slide 110 in response to evacuation slide 110 being deployed. Evacuation slide 110 may begin to inflate and an internal pressure of evacuation slide 110 may increase. Releasable restraint 150 may maintain evacuation slide 110 in a folded position until the internal pressure has increased above a predetermined threshold value. Releasable restraint 150 may separate once the internal pressure of evacuation slide 110 has increased above the predetermined threshold value. Evacuation slide 110 may unfold in response to releasable restraint 150 separating. In this regard, evacuation slide 110 may fully deploy in response to releasable restraint 150 separating.

In various embodiments, releasable restraint 150 may include a first shackle 152 and a second shackle 154. Releasable restraint 150, first shackle 152, and/or second shackle 154 may be metallic. In various embodiments, releasable restraint 150 may comprise a shear pin restraint. In this regard, a first portion 156 of releasable restraint 150 may decouple from a second portion 158 of releasable restraint 150 in response to a predetermined tensioning force illustrated by arrows 160. A first cover 162 and/or a second cover 164 may surround releasable restraint 150. Second cover 164 may surround at least a portion of first cover 162. First cover 162 and second cover 164 may comprise a fabric. For example, first cover 162 and second cover 164 may comprise nylon, ballistic nylon, polypropylene, polyester, cotton, or other suitable material.

Deployment assembly 128 may include a head-end strap 170 coupled between evacuation slide 110 and releasable restraint 150. Head-end strap 170 may be coupled to releasable restraint 150 via second shackle 154. Head-end strap 170 may be coupled to top surface 116 of evacuation slide 110. An end 172 of head-end strap 170 may form a loop through which second shackle 154 is located. In various embodiments, head-end strap 170 may comprise a rope, tape, ribbon, webbing, or other suitable strap. In various embodiments, head-end strap 170 may comprise nylon, ballistic nylon, polypropylene, polyester, cotton, or other suitable material.

Deployment assembly 128 may include an asymmetric yoke 180 coupled between evacuation slide 110 and releasable restraint 150. Asymmetric yoke 180 may be coupled to releasable restraint 150 via first shackle 152. Asymmetric yoke 180 may comprise a first strap 182, a second strap 184, and restraint attachment portion 186. Restraint attachment portion 186 may be located within first cover 162. First strap 182 and second strap 184 may be coupled to releasable restraint 150 via restraint attachment portion 186. In various embodiments, asymmetric yoke 180 may comprise a rope, tape, ribbon, webbing, or other suitable strap. In various embodiments, asymmetric yoke 180 may comprise nylon, ballistic nylon, polypropylene, polyester, cotton, or other suitable material. In various embodiments, first strap 182, a second strap 184, and/or restraint attachment portion 186 of asymmetric yoke 180 may comprise a rope, tape, ribbon, webbing, or other suitable strap. In various embodiments, first strap 182, a second strap 184, and/or restraint attachment portion 186 of asymmetric yoke 180 may comprise nylon, ballistic nylon, polypropylene, polyester, cotton, or other suitable material.

A yoke attach strap 181 may be coupled between asymmetric yoke 180 and evacuation slide 110. Yoke attach strap 181 may be coupled between asymmetric yoke 180 and underside surface 118 of evacuation slide 110. Yoke attach strap 181 may be coupled proximate to a center line of evacuation slide 110, where the center line is parallel to a longitudinal axis of evacuation slide 110 extending from head end 112 to toe end 114 and is equal distance from forward edge 120 and aft edge 122 of evacuation slide 110. In various embodiments, yoke attach strap 181 may comprise a rope, tape, ribbon, webbing, or any other suitable strap. In various embodiments, yoke attach strap 181 may comprise nylon, ballistic nylon, polypropylene, polyester, cotton, or any other suitable material.

With reference to FIG. 3C, an end 188 of restraint attachment portion 186 may form a loop 190 through which first shackle 152 is located. First strap 182, second strap 184, restraint attachment portion 186, yoke attach strap 181, and/or first cover 162 may be sewn together at bartack stitch 194. Restraint attachment portion 186 of asymmetric yoke 180 may extend from first shackle 152 to bartack stitch 194. First strap 182 of asymmetric yoke 180 may be coupled to a forward portion of evacuation slide 110 proximate to forward edge 120 of evacuation slide 110 (FIG. 1) such that first strap 182 extends from bartack stitch 194 to the forward portion of evacuation slide 110. Second strap 184 of asymmetric yoke 180 may be coupled to an aft portion of evacuation slide 110 at aft edge 122 of evacuation slide 110 (FIG. 1), such that second strap 184 extends from bartack stitch 194 to the aft portion of evacuation slide 110. In various embodiments, first strap 182 and second strap 184 may be sewn or otherwise attached to one another at box and cross stitch area 196 and then sewn as a single unit to restraint attachment portion 186 and/or first cover 162 at bartack stitch 194. Yoke attach strap 181 may be sewn or otherwise attached to first strap 182, second strap 184, restraint attachment portion 186, and/or first cover 162 at bartack stitch 194. Yoke attach strap 181 may extend from bartack stitch 194 to underside surface 118 of evacuation slide 110.

Figure 6:
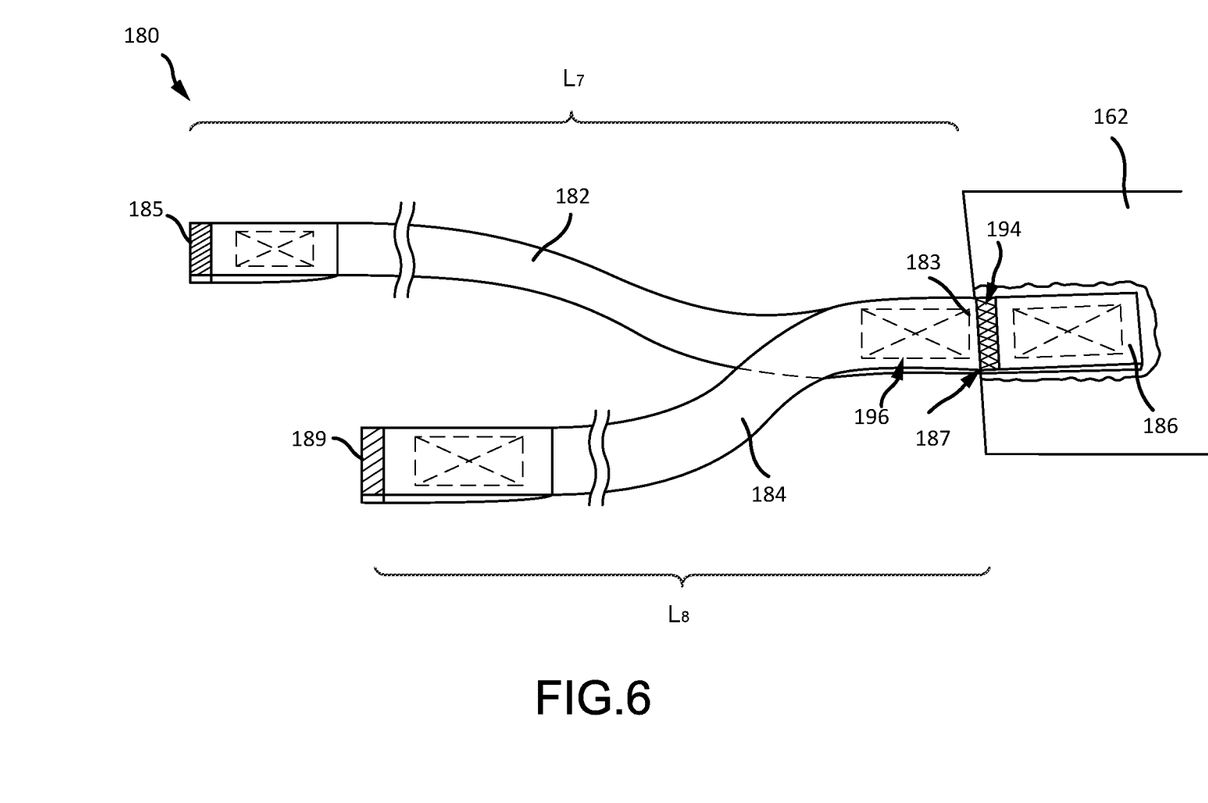
FIG. 6 illustrates an asymmetric yoke, in accordance with various embodiments.

First strap 182 of asymmetric yoke 180 may be longer than second strap 184 of asymmetric yoke 180. For example, with momentary reference to FIG. 6, a length L7 of first strap 182 extending from a first end 183 of first strap 182 at bartack stitch 194 to a second end 185 of first strap 182 that is opposite the first end 183 is greater than a length L8 of second strap 184 extending from a first end 187 of second strap 184 at bartack stitch 194 to a second end 189 of second strap 184 that is opposite first end 187. The longer length of first strap 182, as compared to second strap 184, allows forward edge 120 of evacuation slide 110 (FIG. 1) to open and/or inflate and/or unfold at a faster rate than aft edge 122 of evacuation slide 110, prior to a separation of releasable restraint 150. Deployment assembly 128, including asymmetric yoke 180, may allow a forward portion of toe end 114 of evacuation slide 110 to contact the exit surface prior to an aft portion of toe end 114.

Figure 4A:
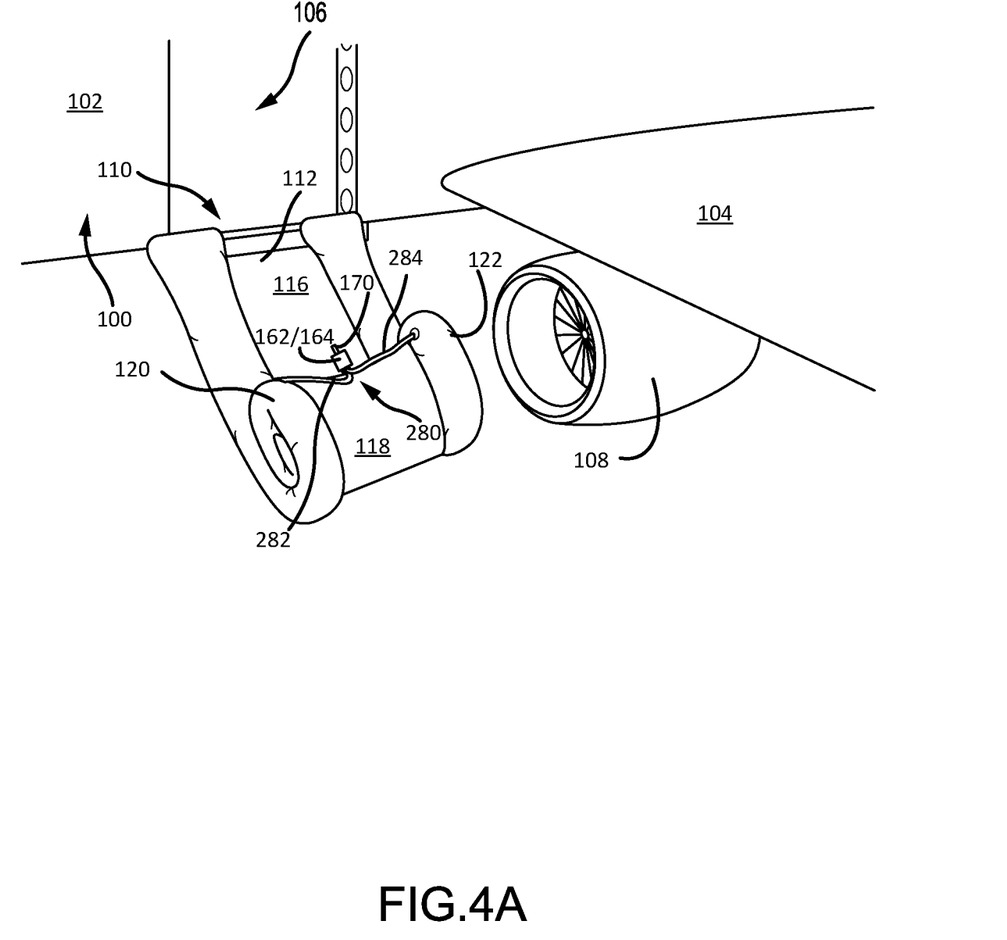
FIGS. 4A, 4B, 4C, and 4D illustrate deployment of an evacuation slide, in accordance with various embodiments.

With reference to FIGS. 4A, 4B, 4C, and 4D, staged deployment of an evacuation slide 110 from aircraft 100 is illustrated, in accordance with various embodiments. With reference to FIG. 4A, a first stage of a deployment of evacuation slide 110 is illustrated, in accordance with various embodiments. An initial yoke 280 (also referred to as a head-end yoke) may be coupled to underside surface 118 of evacuation slide 110 and the releasable restraint within first cover 162 and/or second cover 164. Head-end strap 170 may be coupled to the releasable restraint within first cover 162/second cover 164 and to top surface 116 of evacuation slide 110.

Head-end yoke 280 may include a first strap 282 and a second strap 284. First strap 282 may be coupled to first cover 162 (and/or the releasable restraint within first cover 162) and to forward edge 120 of evacuation slide 110. Second strap 284 may be coupled to first cover 162 (and/or the releasable restraint within first cover 262) and to aft edge 122 of evacuation slide 110. In various embodiments, first strap 282 and second strap 284 of head-end yoke may be approximately the same length (i.e., head-end yoke may be a symmetrical yoke). In other words, a length of first strap 282 extending from a first end of first strap 282 at first cover 162 to a second end of first strap 282 at forward edge 120 is approximately equal to a length of second strap 284 extending from a first end of second strap 284 at first cover 162 to a second end of second strap 284 at aft edge 122. As used herein the phrase "approximately equal" means ±5 inches (±12.7 cm). In various embodiments, forward edge 120 and aft edge 122 may be equally inflated and/or open and/or unfolded, when the releasable restraint coupled between head-end yoke 280 and head-end strap 170 separates.

Figure 4B:
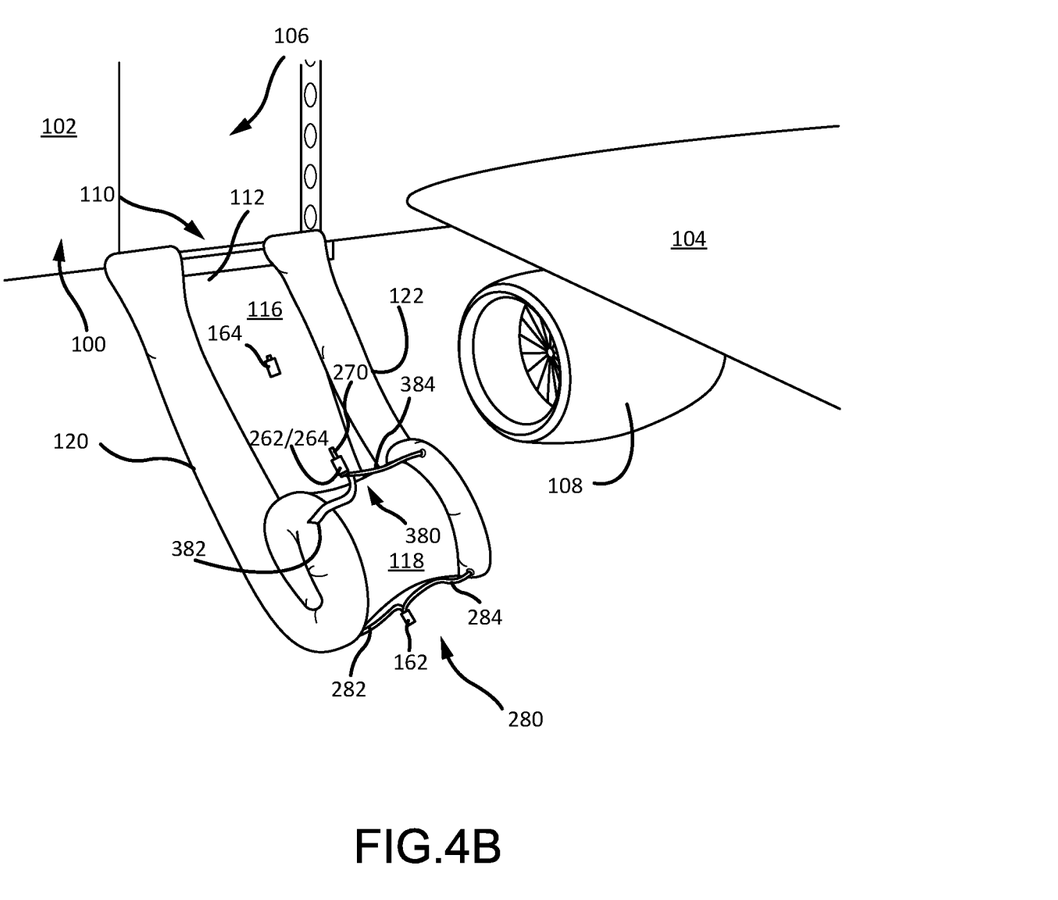

With reference to FIG. 4B, a second stage of a deployment of evacuation slide 110 is illustrated, in accordance with various embodiments. After separation of the releasable restraint coupled between head-end yoke 280 and head-end strap 170, first cover 162 and second cover 164 may separate such that first cover 162 goes with head-end yoke 280 attached to underside surface 118 of evacuation slide 110 and second cover 164 stays with head-end strap 170 on top surface 116 of evacuation slide 110.

A first asymmetric yoke 380 may be coupled to underside surface 118 of evacuation slide 110 and the releasable restraint within a first cover 262 and/or a second cover 264. A head-end strap 270 may be coupled between top surface 116 of evacuation slide 110 and the releasable restraint within first cover 262/second cover 264.

In various embodiments, first asymmetric yoke 380 includes a first strap 382 and a second strap 384. First strap 382 may be coupled to first cover 262 (and/or the releasable restraint within first cover 262) and to a forward portion of evacuation slide 110. Second strap 384 may be coupled to first cover 262 (and/or the releasable restraint within first cover 262) and to an aft portion of evacuation slide 110. In various embodiments, first strap 382 of first asymmetric yoke 380 is longer than second strap 384 of first asymmetric yoke 380. In other words, a length of first strap 382 extending from a first end of first strap 382 at first cover 262 to a second end of first strap 382 attached to the forward portion of evacuation slide 110 is greater than a length of second strap 384 extending from a first end of second strap 384 at first cover 262 to a second end of second strap 384 attached to the aft portion of evacuation slide 110. In various embodiments, first strap 382 may be from 12 inches to 16 inches (30.4 cm to 40.6 cm) longer than second strap 384. In various embodiments, first strap 382 may be from 12 inches to 28 inches (30.4 cm to 71.1 cm) longer than second strap 384. In various embodiments, first strap 382 may be from 12 inches to 45 inches (30.4 cm to 114.3 cm) longer than second strap 384. In various embodiments, first strap 382 may be from 6 inches to 9 feet (i.e., from 15.2 cm to 274.3 cm) longer than second strap 384. In various embodiments, a ratio of the length of first strap 382 to the length of second strap 384 may be between 6:5 and 4:1.

The longer length of first strap 382, as compared to second strap 384, may allow forward edge 120 of evacuation slide 110 to inflate and/or open and/or unfold a faster rate than aft edge 122 of evacuation slide 110, prior to separation of the releasable restraint coupled between first asymmetric yoke 380 and head-end strap 270. Allowing forward edge 120 to inflate and/or opening and/or unfold more than aft edge 122, prior to separation of the releasable restraint, may produce a flow of wind across the top surface 116 of the evacuation slide 110 in a width direction, which is generally perpendicular to a longitudinal axis of evacuation slide (i.e., an axis extending from head end 112 to toe end 114). Allowing forward edge 120 to inflate and/or open and/or unfold more than aft edge 122, prior to separation of the releasable restraint, may produce downward force on the evacuation slide and create negative lift in windy conditions, thereby reducing the likelihood of "kiting" of evacuation slide 110.

In various embodiments, the releasable restraint within first cover 262/second cover 264 may be configured remain unseparated longer than the releasable restraint within first cover 162/second cover 164. In other words, during deployment of evacuation slide 110, the releasable restraint coupled to head-end yoke 280 may be configured to separate prior to the releasable restraint coupled to first asymmetric yoke 380. Configuring the releasable restraint coupled to first asymmetric yoke 380 to separate after the releasable the releasable restraint coupled to head-end yoke 280 may prevent kiting of evacuation slide 110 during deployment.

Figure 4C:
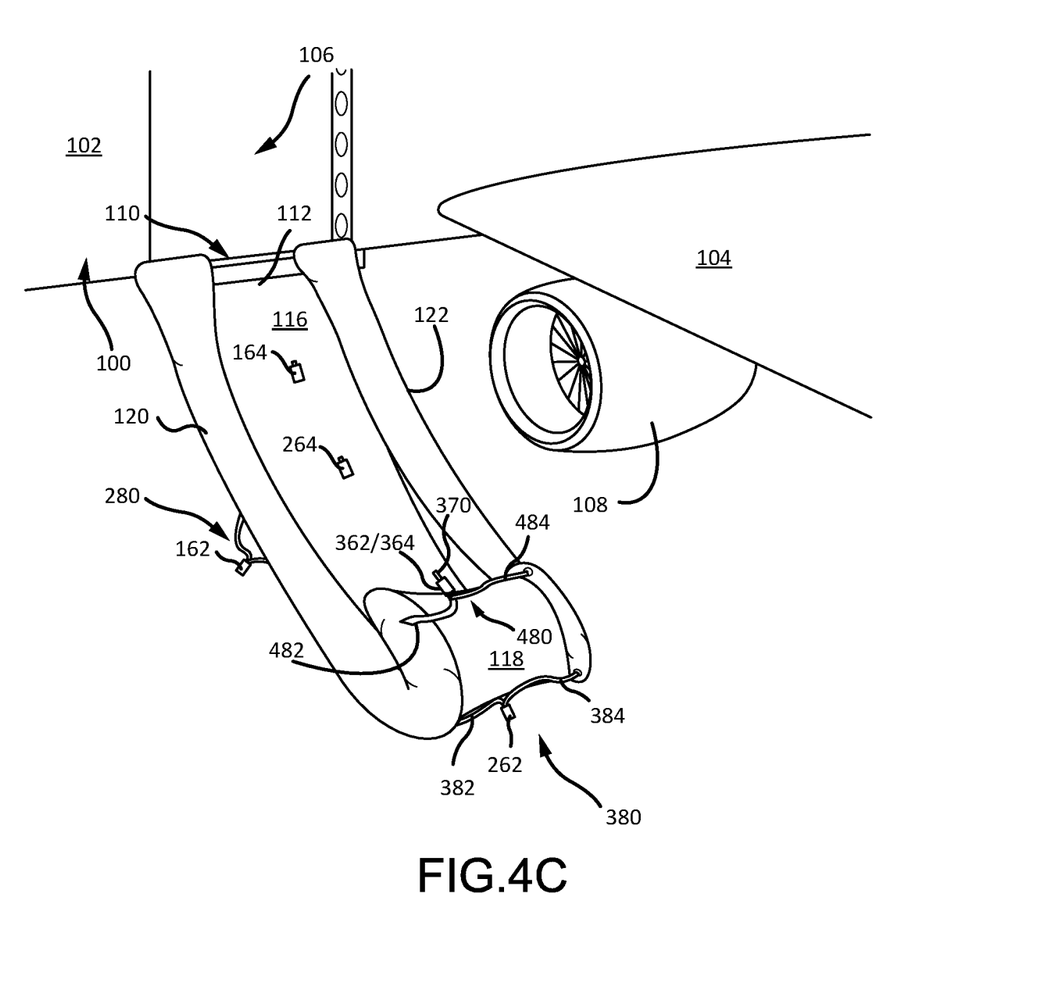

With reference to FIG. 4C, a third stage of a deployment of evacuation slide 110 is illustrated, in accordance with various embodiments. After separation of the releasable restraint coupled between first asymmetric yoke 380 and head-end strap 270, first cover 262 and second cover 264 may separate such that first cover 262 goes with first asymmetric yoke 380 attached on the underside surface 118 of evacuation slide 110 and second cover 264 stays with head-end strap 270 on the top surface 116 of evacuation slide 110.

In various embodiments, a second asymmetric yoke 480 may be coupled to underside surface 118 of evacuation slide 110 and the releasable restraint within a first cover 362 and/or a second cover 364. A head-end strap 370 may be coupled to top surface 116 of evacuation slide 110 and the releasable restraint within first cover 362/second cover 364.

Second asymmetric yoke 480 may include a first strap 482 and a second strap 484. First strap 482 may be coupled to first cover 362 (and/or the releasable restraint within first cover 362) and to a forward portion of evacuation slide 110. Second strap 484 may be coupled to first cover 362 (and/or the releasable restraint within first cover 362) and to an aft portion of evacuation slide 110. In various embodiments, first strap 482 of second asymmetric yoke 480 is longer than second strap 484 of second asymmetric yoke 480. In other words, a length of first strap 482 extending from a first end of first strap 482 at first cover 362 to a second end of first strap 482 at the forward portion of evacuation slide 110 is greater than a length of second strap 484 extending from a first end of second strap 484 at first cover 362 to a second end of second strap 484 at the aft portion of evacuation slide 110. In various embodiments, first strap 482 may be from 12 inches to 16 inches (i.e., from 30.4 cm to 40.6 cm) longer than second strap 484. In various embodiments, first strap 482 may be from 12 inches to 28 inches (30.4 cm to 71.1 cm) longer than second strap 484. In various embodiments, first strap 482 may be from 12 inches to 45 inches (i.e., from 30.4 cm to 114.3 cm) longer than second strap 484. In various embodiments, first strap 482 may be from 6 inches to 9 feet (15.2 cm to 274.3 cm) longer than second strap 484. In various embodiments, a ratio of the length of first strap 482 to the length of second strap 484 may be between 6:5 and 4:1.

The longer length of first strap 482 as compared to second strap 484 may allow forward edge 120 of evacuation slide 110 to inflate and/or open and/or unfold at a faster rate than aft edge 122, prior to separation of the releasable restraint coupled between second asymmetric yoke 480 and head-end strap 370. Allowing forward edge 120 to inflate and/or open and/or unfold more than aft edge 122, prior to separation of the releasable restraint, may produce a flow of wind across the top surface 116 of the evacuation slide 110 in a width direction, which is generally perpendicular to the longitudinal axis of evacuation slide. Allowing forward edge 120 to inflate and/or open and/or unfold more than aft edge 122, prior to separation of the releasable restraint, may produce downward force on the evacuation slide and create negative lift in windy conditions, thereby reducing the likelihood of "kiting" of evacuation slide 110.

In various embodiments, the releasable restraint within first cover 362/second cover 364 may be configured remain unseparated longer than the releasable restraint within first cover 162/second cover 164 and/or longer than the releasable restraint within first cover 262/second cover 264. In other words, during deployment of evacuation slide 110, the releasable restraint coupled to first asymmetric yoke 380 may be configured to separate after the releasable restraint coupled to head-end yoke 280, and the releasable restraint coupled to second asymmetric yoke 480 may be configured to separate after the releasable restraint coupled to first asymmetric yoke 380.

In various embodiments, a difference in length between first strap 382 and second strap 384 of first asymmetric yoke 380 may be greater than a difference in length between first strap 482 and second strap 484 of second asymmetric yoke 480. In other words, a ratio of the length of first strap 382 to second strap 384 may be greater than a ratio of the length of first strap 482 to second strap 484.

Figure 4D:
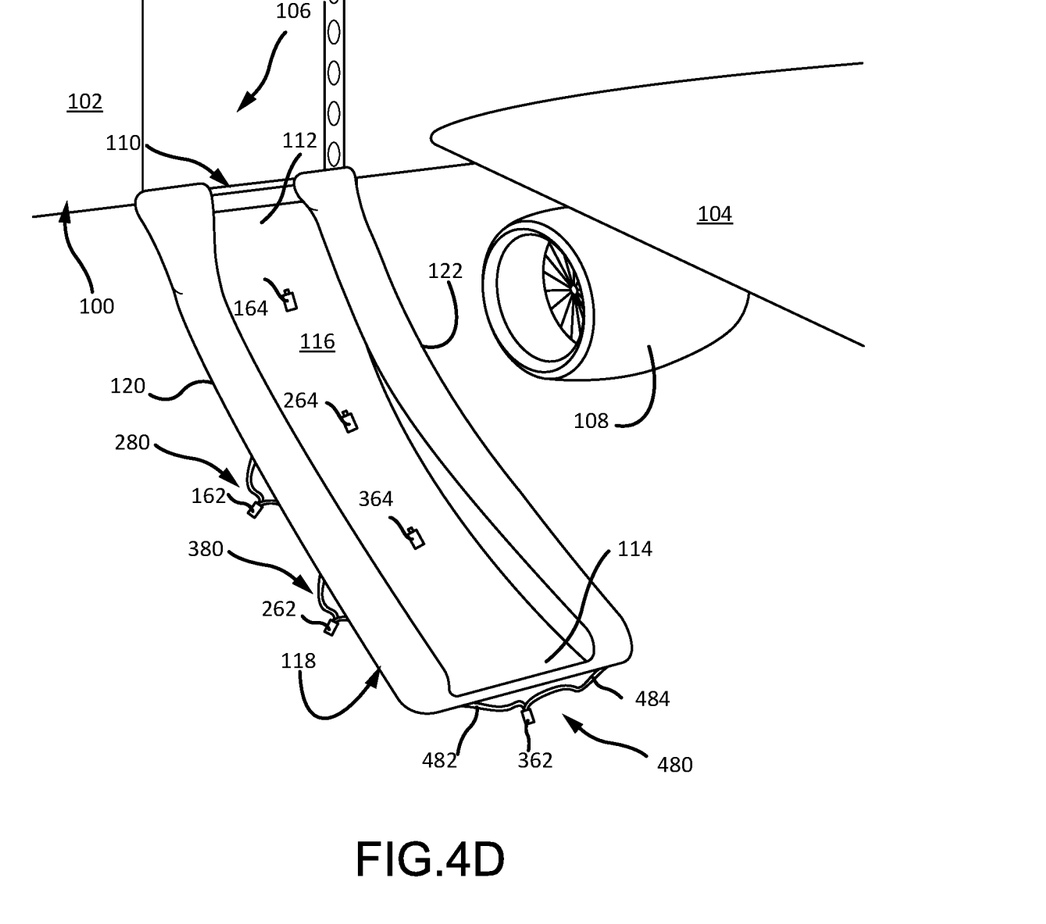

With reference to FIG. 4D, a fully-deployed evacuation slide 110 is illustrated, in accordance with various embodiments. After separation of the releasable restraint coupled between second asymmetric yoke 480 and head-end strap 370, first cover 362 and second cover 364 may separate such that first cover 362 goes with second asymmetric yoke 480 attached on the underside surface 118 of evacuation slide 110 and second cover 364 stays with head-end strap 370 on the top surface of evacuation slide 110.

Figure 5:
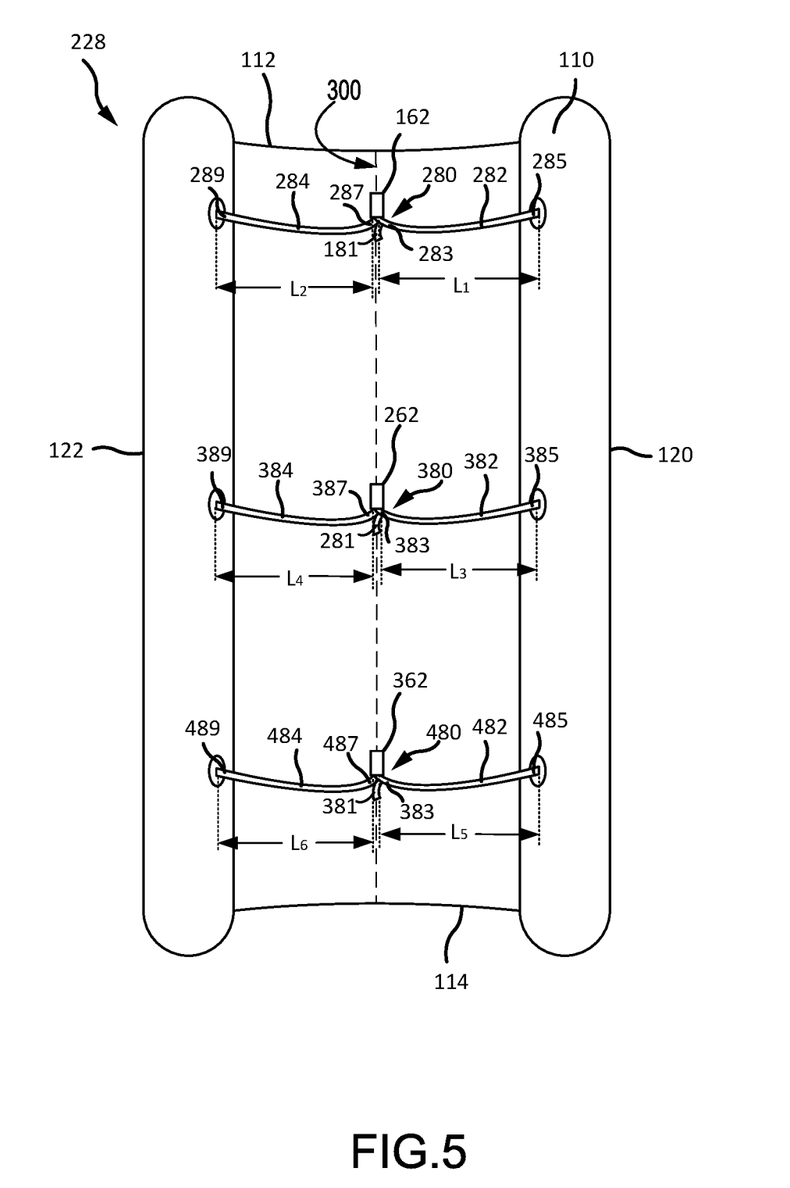
FIG. 5 illustrates an underside surface of an evacuation slide in a deployed position, in accordance with various embodiments.

With reference to FIG. 5, a view of the underside surface 118 of an evacuation slide 110 in a deployed position is illustrated, in accordance with various embodiments. In various embodiments, a deployment assembly 228 may be coupled to evacuation slide 110 and configured such that during deployment of evacuation slide 110 a forward portion of toe end 114 contacts the exit surface prior to an aft portion of toe end 114. Deployment assembly 228 may comprise three yokes (e.g., head-end yoke 280, first asymmetric yoke 380, and second asymmetric yoke 480). Head-end yoke 280 may be located proximate to head end 112 of evacuation slide 110 relative to first asymmetric yoke 380 and to second asymmetric yoke 480. First asymmetric yoke 380 may be located proximate to head end 112 of evacuation slide 110 relative to second asymmetric yoke 480. Second asymmetric yoke 480 may be located proximate to toe end 114 of evacuation slide 110 relative to first asymmetric yoke 380 and to head-end yoke 280.

In various embodiments, head-end yoke 280 may be a symmetric yoke such that a length L1 of first strap 282 extending from a first end 283 of first strap 282 located at cover 162 to a second end 285 of first strap 282 coupled to a forward portion evacuation slide 110 proximate to forward edge 120 of evacuation slide 110 is approximately equal to a length L2 of second strap 284 extending from a first end 287 of second strap 284 located at first cover 162 to a second end 289 of second strap 284 coupled to an aft portion of evacuation slide 110 proximate to aft edge 122 of evacuation slide 110. As used herein the term "approximately" means ±5 inches (±12.7 cm). In various embodiments, L1 may be between 24 inches and 90 inches (i.e., from 61.0 cm and 228.6 cm) and L2 may be between 24 inches and 90 inches (i.e., from 61.0 cm and 228.6 cm). For example, L1 may be, approximately, 33 and ⅛ inches (84.1 cm) and L2 may be, approximately, 33 and ⅛ inches (84.1 cm).

Yoke attach strap 181 may be coupled to first cover 162 and an area of underside surface 118 proximate to a center line 300 of evacuation slide 110, where the center line 300 is parallel to a longitudinal axis of evacuation slide 110 extending from head end 112 to toe end 114, and is equal distance from forward edge 120 and aft edge 122 of evacuation slide 110.

In various embodiments, first asymmetric yoke 380 of deployment assembly 228 may be positioned closer to toe end 114 of evacuation slide 110 than head-end yoke 280. A yoke attach strap 281 may be coupled to first cover 262 and an area of underside surface 118 proximate to center line 300 of evacuation slide 110. A yoke attach strap 381 may be coupled to first cover 362 and an area of underside surface 118 proximate to center line 300 of evacuation slide 110.

First asymmetric yoke 380 may include first and second straps of different length. A length L3 of first strap 382 of first asymmetric yoke 380 extending from a first end 383 of first strap 382 located at first cover 262 to a second end 385 of first strap 382 coupled to a forward portion of evacuation slide 110 proximate to forward edge 120 of evacuation slide 110 is greater than a length L4 of second strap 384 extending from a first end 387 of second strap 384 located at first cover 262 to a second end 389 of second strap 384 coupled to an aft portion of evacuation slide 110 proximate to aft edge 122 of evacuation slide 110.

In various embodiments, length L3 may be between 44 inches and 90 inches (i.e., from 111.8 cm and 228.6 cm) and length L4 may be between 24 inches and 78 inches (i.e., from 61.0 cm and 198.1 cm). For example, L3 may be, approximately, 49 and ⅛ inches (124.8 cm) and L4 may be, approximately, 33 and ⅛ inches (84.1 cm); L3 may be, approximately, 61 and ⅛ inches (155.3 cm) and L4 may be, approximately, 33 and ⅛ inches (84.1 cm); L3 may be, approximately, 78 and ⅛ inches (198.4 cm) and L4 may be, approximately, 33 and ⅛ inches (84.1 cm). As used herein the term "approximately" means ±5 inches (±12.7 cm).

In various embodiments, a ratio of length L3 to length L4 may be between 6:5 and 4:1. For example, a ratio of length L3 to length L4 may be 3:2; a ratio of length L3 to length L4 may be 9:5; a ratio of length L3 to length L4 may be 12:5.

In various embodiments, second asymmetric yoke 480 of deployment assembly 228 may be positioned closer to toe end of 114 of evacuation slide 110 than head-end yoke 280 and first asymmetric yoke 380. A length L5 of first strap 482 of second asymmetric yoke 480 extending from a first end 483 of first strap 482 located at first cover 362 to a second end 485 of first strap 482 coupled to a forward portion of evacuation slide 110 proximate to forward edge 120 of evacuation slide 110 may be greater than a length L6 of second strap 484 extending from a first end 487 of second strap 484 located at first cover 362 to a second end 489 of second strap 484 coupled to an aft portion of evacuation slide 110 proximate to aft edge 122 of evacuation slide 110.

In various embodiments, length L5 may be between 44 inches and 90 inches (i.e., from 111.8 cm and 228.6 cm) and length L6 may be between 24 inches and 78 inches (i.e., from 61.0 cm and 198.1) cm). For example, L5 may be, approximately, 49 and ⅛ inches (124.8 cm) and L6 may be, approximately, 33 and ⅛ inches (84.1 cm); L5 may be, approximately, 61 and ⅛ inches (155.3 cm) and L6 may be, approximately, 33 and ⅛ inches (84.1 cm); L5 may be, approximately, 78 and ⅛ inches (198.4 cm) and L6 may be, approximately, 33 and ⅛ inches (84.1 cm). As used herein the term "approximately" means ±5 inches (±12.7 cm).

In various embodiments, a ratio of length L5 to length L6 may be between 6:5 and 4:1. For example, a ratio of length L5 to length L6 may be 3:2; a ratio of length L5 to length L6 may be 9:5; a ratio of length L5 to length L6 may be 12:5.

In various embodiments, length L2, length L4, and/or length L6 may be approximately equal. As used herein the phrase "approximately equal" means ±5 inches (±12.7 cm).

In various embodiments, a difference between length L3 and length L4 is greater than a difference between length L5 and length L6. For example, in various embodiments length L3 is from 28 inches to 50 inches longer than length L4, and length L5 is from 12 inches to 28 inches longer than length L6.

In various embodiments, a ratio of length L3 to length L4 is greater than a ratio of length L5 to length L6. For example, in various embodiments a ratio of length L3 to length L4 is from 9:5 to 4:1 and a ratio of length L5 to length L6 is from 6:5 to 9:5.

Deployment assembly 228 may include any number of asymmetric and/or symmetric yokes. In various embodiments, deployment assembly 228 may include a plurality of asymmetric yokes. In various embodiments, a difference in length of the first straps of the asymmetric yokes to a length of the second straps of the asymmetric yoke may decrease in a direction of head end 112 to toe end 114 of evacuation slide 110 (i.e., the difference in length of the first straps of the asymmetric yokes and the second straps of the asymmetric yoke decreases the closer the asymmetric yoke is to toe end 114 of evacuation slide 110). For example, asymmetric yokes located closer to head end 112 of evacuation slide 110 may have first and second straps with a greater difference in length than asymmetric yokes located closer to toe end 114 of evacuation slide 110.

In various embodiments, a ratio of a length of the first straps of the asymmetric yokes to a length of the second straps of the asymmetric yokes may decrease in a direction of head end 112 to toe end 114 of evacuation slide 110 (i.e., the ratio of the length of the first straps of the asymmetric yokes to the length of the second straps of the asymmetric yoke decreases the closer the asymmetric yoke is to toe end 114 of evacuation slide 110). For example, a ratio of a length of the first straps to a length of the second straps of asymmetric yokes located closer to head end 112 of evacuation slide 110 may be greater than a ratio of a length of the first straps to a length of the second straps of asymmetric yokes located closer to toe end 114 of evacuation slide 110.

In various embodiments, a decrease in a difference in a length of the first straps of the asymmetric yokes to a length of the second straps of the asymmetric yoke is related to a timing of the separation of the releasable restraints coupled to the asymmetric yokes. For example, asymmetric yokes coupled to releasable restraints that separate earlier in the deployment of evacuation slide 110 may have first and second straps with a greater difference in length than asymmetric yokes coupled to releasable restraints that separate later in the deployment of evacuation slide 110.

Figure 7:
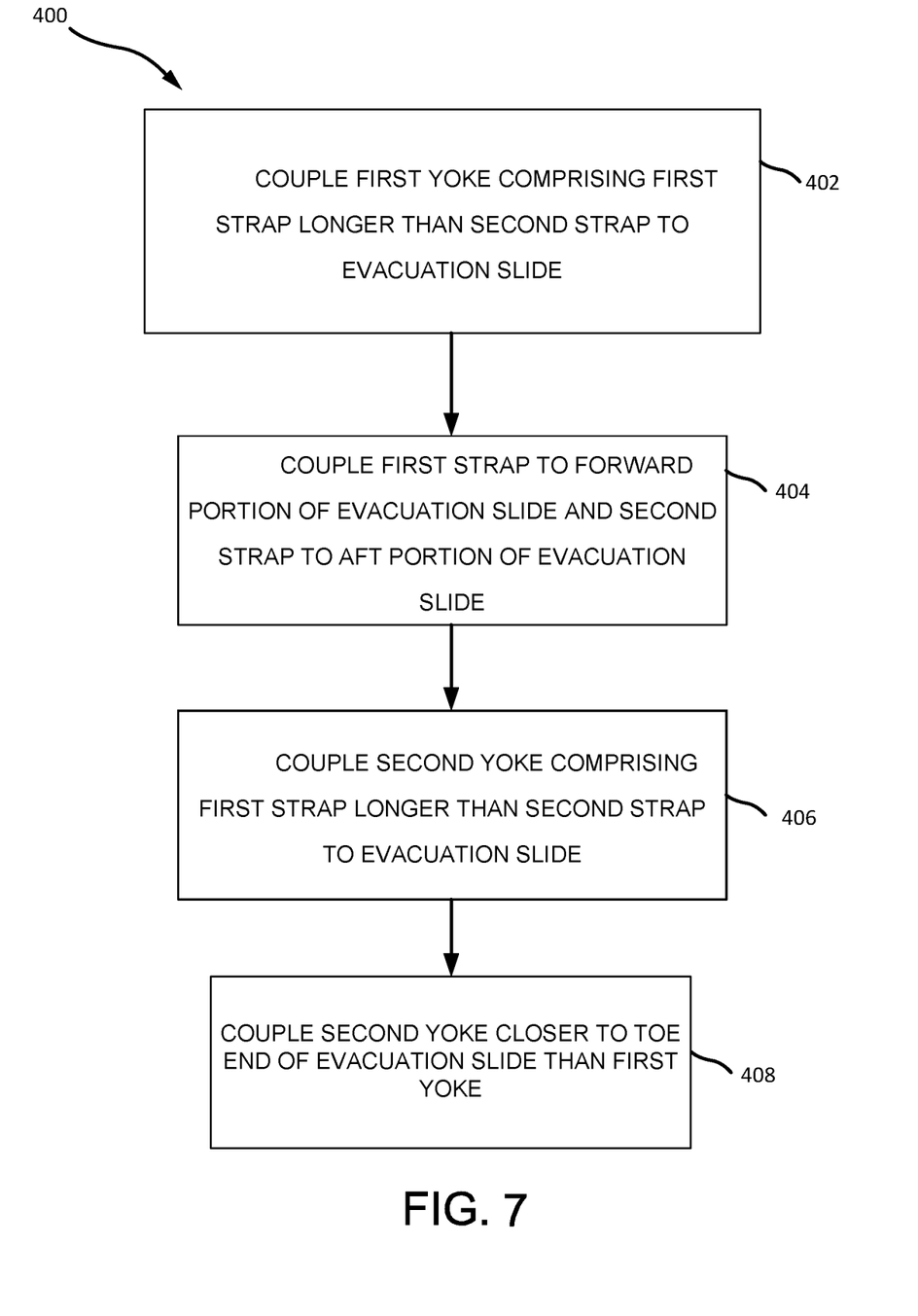
FIG. 7 illustrates of a method of making an evacuation assembly, in accordance with various embodiments.

With reference to FIG. 7, a method 400 of making an evacuation assembly is provided, in accordance with various embodiments. The method 400 comprises coupling a first yoke comprising a first strap longer than a second strap to an evacuation slide (step 402). Method 400 may include coupling the first strap to a forward portion of the evacuation slide and coupling the second strap to an aft portion of the evacuation slide (step 404). Method 400 may include coupling a second yoke comprising a first strap longer than a second strap to the evacuation slide (step 406). Method 400 may include coupling the second yoke closer to a toe end of the evacuation slide than the first yoke (step 408).

In various embodiments, with combined reference to FIG. 5 and FIG. 7, step 402 may include coupling first asymmetric yoke 380 comprising first strap 382 longer than second strap 384 to evacuation slide 110. Step 404 may include coupling first strap 382 to a forward portion of evacuation slide 110 and coupling second strap 384 to an aft portion of evacuation slide 110. Step 406 may include coupling second asymmetric yoke 480 comprising first strap 482 longer than second asymmetric yoke 480 to evacuation slide 110. Step 408 may include coupling second asymmetric yoke 480 closer to toe end 114 of evacuation slide 110 than first asymmetric yoke 380.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A yoke for an evacuation system, comprising:
 a first strap;
 a second strap coupled to the first strap, wherein the first strap is sewn to the second strap at a stitching, and wherein the first strap is longer than the second strap; and
 a restraint attachment portion extending from the stitching.

2. The yoke of claim 1, wherein a ratio of a length of the first strap to a length of the second strap is from 6:5 to 4:1.

3. The yoke of claim 1, wherein the first strap is from 6 inches to 9 feet longer than the second strap.

4. The yoke of claim 1, wherein the first strap, the second strap, and the restraint attachment portion are sewn together.

5. The yoke of claim 1, wherein an end of the restraint attachment portion forms a loop.

6. The yoke of claim 5, further comprising a releasable restraint located through the loop formed by the restraint attachment portion.

7. The yoke of claim 1, further comprising a yoke attach strap attached to at least one of the first strap, the second strap, or the restraint attachment portion.

8. The yoke of claim 7, wherein the yoke attach strap and the at least one of the first strap, the second strap, or the restraint attachment portion are sewn together.

9. The yoke of claim 7, wherein the yoke attach strap, the first strap, the second strap, and the restraint attachment portion are sewn together at a bartack stitch.

* * * * *